Sept. 4, 1956     J. W. GRAY ET AL     2,761,332
DIFFERENTIAL GEAR
Filed Aug. 11, 1953
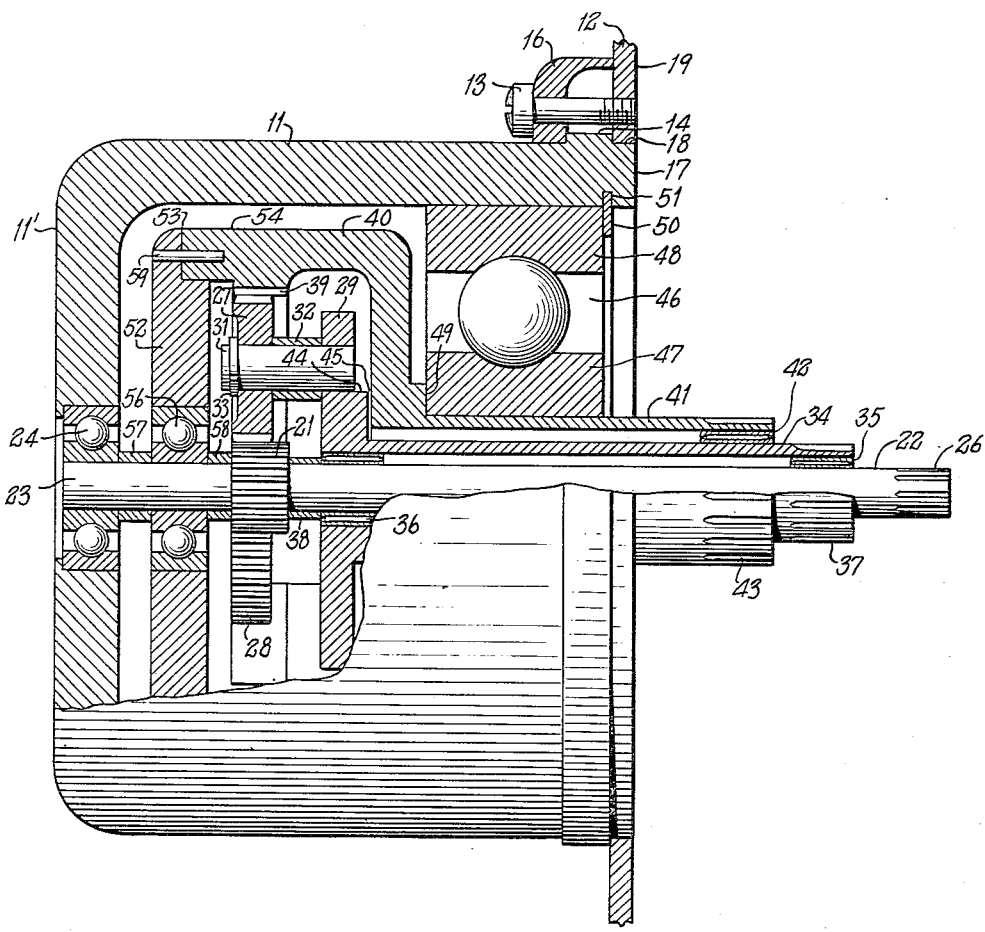
JOHN W. GRAY
ARTHUR F. HAYEK
RONALD A. FINKLER
HARRY J. REED, Jr.
INVENTORS
BY
ATTORNEY

United States Patent Office 2,761,332
Patented Sept. 4, 1956

2,761,332
DIFFERENTIAL GEAR

John W. Gray and Arthur F. Hayek, Pleasantville, Ronald A. Finkler, East White Plains, and Harry J. Reed, Jr., Pleasantville, N. Y., assignors to General Precision Laboratory Incorporated, a corporation of New York Application August 11, 1953, Serial No. 373,536

2 Claims. (Cl. 74—674)

This invention relates to differential gears and particularly to differential gears having their three mechanical terminals coaxial and extending in the same direction. More specifically the invention relates to a compact differential gear so constructed as to be easily attached to and disengaged from an associated mechanism without disturbing or requiring any dismantlement of the associated mechanism.

Differential gears are commonly used both in machinery for transmitting power to two loads, and in computers for adding and subtracting shaft quantities. Such gears must usually be made to close tolerances, particularly in instrumentations, and are usually built as a single self-contained unit so as to preserve the required mesh tolerance relations. It is convenient to make such a unit in a compact packaged form having provision for support from a single frame wall and having its mechanism terminal connections brought to a single location.

The instant invention provides such a differential for convenient mounting on a single frame plate. When this construction is employed the differential may be removed from an assembly without dismantling or disturbing any other components.

The purpose of this invention is to provide a differential gear having its mechanical terminals coaxial and brought out on the same side of the frame.

More specifically, the purpose of this invention is to provide an epicyclic differential gear having two or more epicyclic members with its three mechanical terminals consisting of a shaft and two tubes coaxially surrounding the shaft, for attachment to a frame plate transverse the terminal axis.

Still more specifically, the purpose of this invention is to provide a planetary differential gear containing one sun gear, three planet gears and an internal ring gear, the differential having its three mechanical terminals coaxial and together for "plug-in" attachment.

A further understanding of this invention may be secured from the detailed description and drawings, in which the single figure is a partly cross-sectional view of the differential gear assembly.

Referring now to the figure, a planetary differential is contained in a cylindrical case 11 having an end disc 11' closing one end and secured to a frame plate 12 by three screws, one of which is shown at 13. These three screws are positioned at 120° intervals around the periphery of the case and clamp a ring 14 on the case to the frame plate 12 by means of three dogs 16. The open end 17 of the case 11 is let into a round hole 18 in the frame plate 12 until stopped by the ring 14, the open end 17 being flush with the inner surface 19 of the frame plate 12 and the case 11 having such fit in the frame plate 12 that the two can be easily and quickly assembled and disassembled.

A planetary sun gear 21 is secured to or is integral with its shaft 22, which is long enough to protrude some distance to the right of the frame plate 12 in the figure. The shaft continues to the left of the sun gear 21 in a stub 23 which is secured in the case 11 by means of a ball bearing 24. The end of shaft 22 forms one mechanical terminal or leg of the differential, and is provided with a spur gear 26. This gear may well be cut directly in the shaft as illustrated, or alternatively, may be separately formed and secured to the shaft.

Three planet gears are arranged to mesh at 120° intervals around the sun gear 21, one of them, 27, being shown in section and another, 28, not in section. These three planet gears are journalled on pins which are secured in a circular spider plate 29. The pin 31 carries planet gear 27 which is separated from the spider plate 29 by a spacer 32 to reduce friction. The planet gear 27 is secured in place by a snap ring 33 in a groove near the end of pin 31 so that planet gear 27 may rotate freely, but with little end play, on pin 31. The end of the planet gear 27 is countersunk so that the pin 31 will not project so far, thus conserving space.

The spider plate 29 is formed integral with a tube 34 which is fitted for free rotation around shaft 22 on needle bearings 35 and 36 and which protrudes to the right in the drawing beyond frame plate 12, but not as far as the end of shaft 22. Thus the pinion 26 is not covered by tube 34. The end of tube 34 is provided with a pinion 37 cut directly into the end of the tube although alternatively a pinion or gear may be secured to the end of the tube. A spacer 38 is provided on shaft 22 to space the spider plate 29 from the sun gear 21.

Internal ring gear teeth 39 are formed on a cup-like internal gear body 40. This body is integral with a tube 41 which surrounds tube 34 and rotates on it on a needle bearing 42. The tube 41 protrudes to the right in the drawing beyond frame plate 12, but does not extend so far as to cover the pinion 37 of tube 34. A pinion 43 is cut in the end of tube 41 although alternatively a separate gear may be secured to the end of the tube. The spider plate 29 is formed with a shoulder 44 to separate it from the internal gear body 39 and in addition a washer 45 is inserted to reduce friction.

A ball bearing 46 is positioned with its inner race 47 fitted to the tube 41 and with its outer race 48 fitted in the inner cylindrical surface of the case 11. A shoulder 49 on internal gear body 40 spaces the ball bearing 46 from it to prevent friction between the gear body 40 and outer race 48. A snap ring 50 snapped into an internal groove 51 in the case 11 secures the ball bearing 46 in place, thereby also holding all the moving parts in their correct axial positions.

A disc 52 is mortised at 53 into the cylindrical extension 54 of the gear body 40, and is journalled at its center through a ball bearing 56 on the shaft extension 23. Spacer 57 spaces the ball bearings 56 and 24, and a spacer 58 spaces ball bearing 56 from gear 21. Disc 52 is press fitted into cylinder 54 and is pinned thereto by several pins one of which is indicated at 59. The purpose of disc 52 is to fix the position of the internal gear body 54 relative to the shaft, as otherwise it would have some radial motion within the limits of the sum of the clearances and tolerances of the sun, planet and internal gear teeth.

In operation, mechanical gear meshing connections are made to the pinions 26, 37 and 43 which serve as the mechanical terminals of the differential, or to gears mounted on tubes 41 and 34 and shaft 22, so that the differential may be used, for example, in the computing operations of addition and subtraction. In such operations two of the three mechanical terminals are used as inputs to introduce motion and the third terminal is used as output and has a motion which is the algebraic sum of the input motions multiplied by gear ratio constants. The differential is thus used for the algebraic addition of angular position, speed or acceleration.

The differential may be removed with great ease for servicing or to substitute a new differential or one with different internal ratios. As described, the removal operation consists merely of loosening or removing three screws 13 with their dogs 16, when the differential may be withdrawn from the gears meshing with terminal pinions 26, 37 and 43 and removed from the frame plate 12. In replacement, the differential is inserted in the hole 13 in frame plate 12 until its case ring 14 abuts the frame plate and the three pinions 26, 37 and 43 mesh with their mating gears. Screws 13 and dogs 16 are then placed and tightened.

What is claimed is:

1. A differential assembly comprising, a cylindrical casing having an end plate, a spur sun gear and shaft positioned coaxially in said casing, one end of said shaft being journalled in said end plate and the other end of said shaft extending outside of said casing, three spur planet gears meshed with said sun gear, said planet gears being journalled at equal angular distances on one face of a spider plate, an inner tube positioned coaxially and rotatably around said shaft, said inner tube having one end secured to said spider plate, said inner tube extending outside of said casing but to a less distance than said shaft, a cup-like internal gear body bearing internal teeth, said teeth meshing with said planet gears, an outer tube positioned coaxially and rotatably around said inner tube, said outer tube having one end secured to said internal gear body, said outer tube extending outside of said casing but to a less distance than said inner tube, said outer tube being journalled in said casing, said internal gear body being rotatably supported on said shaft at the end thereof remote from said outer tube journal, a frame plate having an aperture, and means for securing the open end of said casing to said frame plate so that said shaft, inner tube and outer tube extend through the aperture in said frame plate.

2. A differential gear assembly comprising, a cylindrical casing having an end plate partly enclosing one end and having the other end open, a planetary differential including a sun gear and shaft positioned axially in said casing, one end of said shaft being journalled in said end plate and the other end of said shaft extending out of the open end of said casing, at least two planet gears meshed with said sun gear, said planet gears being journalled at equal angular distances on one face of a spider plate, an inner tube positioned coaxially around said shaft and rotatably borne thereon by antifriction bearings, said inner tube having one end secured to said spider plate, said inner tube extending out of the open end of said casing but to a less distance than said shaft, a cup-like internal gear body bearing internal teeth, said teeth meshing with said planet gears, the open end of said cup being at least partly closed by a plate borne by an antifriction bearing on said shaft between said sun gear and the end plate of said cylindrical casing, an outer tube positioned coaxially around said inner tube and borne thereon by an antifriction bearing, said outer tube having one end secured to said cup-like internal gear body, said outer tube extending out of the open end of said casing but to a less distance than said inner tube, said outer tube being journalled through an antifriction bearing in the open end of said casing, a frame plate having an aperture, means for securing the open end of said casing to said frame plate so that said shaft, inner tube and outer tube extend through the aperture in said frame plate, and gear means for making meshing connections to the respective ends of said shaft, inner tube and outer tube.

References Cited in the file of this patent

UNITED STATES PATENTS

| 376,528 | Kite | Jan. 17, 1888 |
| 1,291,126 | Porter | Jan. 14, 1919 |
| 1,329,387 | Fay | Feb. 3, 1920 |
| 1,434,620 | McCain | Nov. 7, 1922 |
| 1,821,450 | Stelzer | Sept. 1, 1931 |
| 1,960,141 | D'Ascanio | May 22, 1934 |
| 2,267,562 | Higgins | Dec. 23, 1941 |

FOREIGN PATENTS

| 920,062 | France | Mar. 26, 1947 |